(12) United States Patent  (10) Patent No.: US 10,751,728 B2
Feng  (45) Date of Patent: Aug. 25, 2020

(54) CUTTING FLUID RECYCLING DEVICE

(71) Applicant: Jian Feng, Guangdong (CN)

(72) Inventor: Jian Feng, Guangdong (CN)

(73) Assignee: DONGGUAN XUNMEI ENVIRONMENTAL PROTECTION TECHNOLOGY, INC, Dongguan, Guangdong (CN)

( * ) Notice: Subject to any disclaimer, the term of this patent is extended or adjusted under 35 U.S.C. 154(b) by 108 days.

(21) Appl. No.: 15/767,144

(22) PCT Filed: Jan. 22, 2016

(86) PCT No.: PCT/CN2016/071755
§ 371 (c)(1),
(2) Date: Apr. 10, 2018

(87) PCT Pub. No.: WO2017/124437
PCT Pub. Date: Jul. 27, 2017

(65) Prior Publication Data
US 2019/0070615 A1  Mar. 7, 2019

(51) Int. Cl.
*B03C 1/033* (2006.01)
*B01D 33/11* (2006.01)
(Continued)

(52) U.S. Cl.
CPC ............ *B03C 1/0332* (2013.01); *B01D 33/11* (2013.01); *B01D 33/50* (2013.01); *B01D 35/06* (2013.01);
(Continued)

(58) Field of Classification Search
CPC ......... B03C 1/0332; B03C 1/286; B03C 1/30; B03C 2201/18; B03C 2201/20; B03C 1/24; B03C 1/247; B03C 1/10; B03C 1/12; B23Q 11/005; B23Q 11/1069; B23Q 11/0064; B01D 33/11; B01D 33/50; B01D 35/06;
(Continued)

(56) References Cited

U.S. PATENT DOCUMENTS

2004/0182769 A1 * 9/2004 Fogel ..................... B01D 35/06
   210/222
2006/0049112 A1 * 3/2006 Moore .................... B03C 1/286
   210/695

(Continued)

FOREIGN PATENT DOCUMENTS

CN  103865624 A  *  6/2014

OTHER PUBLICATIONS

English language machine translation of CN 103865624 A. (Year: 2019).*

*Primary Examiner* — David C Mellon

(57) ABSTRACT

A cutting fluid intelligent recycling device, comprises a frame, a first-level filtering device, second-level filtering device, and clean liquid tank installed on the frame; the first-level filtering device being provided with a dirty fluid tank used for containing liquid, the dirty fluid tank having a dirty fluid suction device and dirty fluid treatment device; through the first-level and second-level filtering devices, the cutting fluid intelligent recycling device can remove the cuttings, iron powder, floating oil stain, cenobium, floccule and impurities in the cutting dirty fluid and also sterilize and deodorize the cutting fluid coolant to prolong its service life.

10 Claims, 10 Drawing Sheets

(51) Int. Cl.
*B03C 1/28* (2006.01)
*B03C 1/30* (2006.01)
*B01D 35/06* (2006.01)
*B01D 33/50* (2006.01)
*B23Q 11/10* (2006.01)
*B23Q 11/00* (2006.01)

(52) U.S. Cl.
CPC ........... *B03C 1/286* (2013.01); *B03C 1/30* (2013.01); *B23Q 11/005* (2013.01); *B23Q 11/1069* (2013.01); *B03C 2201/18* (2013.01); *B03C 2201/20* (2013.01)

(58) Field of Classification Search
CPC ........ B01D 36/00; B01D 36/02; B01D 36/04; B01D 36/045; B01D 36/003; B01D 36/005; B01D 36/008
USPC .......................................... 210/222, 223, 695
See application file for complete search history.

(56) References Cited

U.S. PATENT DOCUMENTS

| | | | | |
|---|---|---|---|---|
| 2008/0251435 A1* | 10/2008 | Tashiro | ............. | B01D 21/2433 210/138 |
| 2009/0184040 A1* | 7/2009 | Tashiro | ............. | B01D 21/2427 210/223 |
| 2015/0023752 A1* | 1/2015 | Matsuyama | ....... | B23Q 11/1069 409/137 |

* cited by examiner

CUTTING FLUID RECYCLING DEVICE

BACKGROUND OF INVENTION

1. Field of the Invention

The present invention relates to a field of a cutting fluid intelligent recycling device.

2. Description of Related Art

With the overall technology development of the mechanical industry, the machine tool cutting speed is faster, the cutting load is bigger, the cutting temperature is higher and new processes constantly emerge to adapt to the new material processing; and all these need some new-type high-performance cutting fluid to satisfy the processing requirements. Therefore, the cutting fluid development has become a trend.

The cutting fluid is a kind of industrial liquid used for cooling and lubricating the tools and workpieces during the metal cutting and grinding process. The cutting fluid is compounded of multiple super-strong function additives scientifically and characteristic of good cooling performance, lubricating performance, anti-rust resistance, degreasing and cleaning function and anticorrosive function as well as easy dilution at the same time. Without the lubrication and cooling by the cutting fluid, the high-speed cutting, processing quality, production efficiency and other factors would be out of the question. However, the problems like deterioration, becoming stinky and dirty fluid treatment and emission would all be encountered during the normal application of the cutting fluid.

The guide rail oil, spindle oil, hydraulic oil and various chip, powder, dust and other impurities would be mixed in the cutting fluid during the machine tool device operation. The mixing of the impurities has included a large number of organic particles, which are the food for mass bacteria reproduction exactly. This is the basic reason causing the cutting fluid to become stinky and deteriorate.

The bacteria bred mainly include the two categories of aerobic bacteria and anaerobic bacteria, whichever can bring great harm to the cutting fluid.

1. The anaerobic bacteria can reduce sulfate, thiosulfate, sulfite, etc. to release thiol and hydrogen sulfide gases and produce foul smell, thus destroying the ecological environment and affecting the human health.

2. The metabolism of bacteria would produce some acidic substances to cause corrosion to the machine tool and workpiece and destroy the stability of emulsion, thus greatly reducing the lubricating performance of cutting fluid.

3. The bacteria destroy the oiliness additive and extreme pressure additive in the cutting fluid, which causes the friction force increase and calorific value increase during processing and results in poorly finished surface and tool service life shortening ultimately.

4. The mass reproduction of bacteria reduces the service life of the cutting fluid by 65% to 85%.

To sum up, the deterioration of cutting fluid would not only bring many adverse consequences to the metal cutting processing, but also result in the cutting fluid wasting and ecological environment destruction. Moreover, under the adverse influence of the deteriorated cutting fluid, the machine tool device maintenance cost and the time of dirty fluid cleaning by the working personnel would be increased, affecting the work efficiency.

SUMMARY OF THE INVENTION

Based on this, it is necessary to provide a cutting fluid intelligent recycling device specific to the deficiencies of the existing technology, which can effectively remove the cuttings, iron powder, floating oil stain and cutting fluid residue in the dirty fluid of cutting fluid to ensure a very good filtering effect and recycle the dirty fluid after treatment, having effectively reduce the emission quantity of wastewater and maintained the stability of the ecological environment.

A cutting fluid intelligent recycling device, comprising a frame and a first-level filtering device, a second-level filtering device, a third-level filtering device and a clean fluid tank installed on the frame; wherein the first-level filtering device is disposed at one side of the frame and includes a dirty fluid tank used for containing liquid; the dirty fluid tank includes a dirty fluid suction device and a dirty fluid treatment device disposed on a top thereof; wherein the dirty fluid suction device is a vacuum drum suction device and includes a vacuum tube, a first liquid inlet pipe, and a first liquid outlet pipe; the first liquid outlet pipe is connected with the dirty fluid treatment device on one end; and the vacuum tube is connected with an external vacuum device; wherein the dirty fluid treatment device includes a filtering drum, a first driving device, a recycling device, and a first air ducting pipe; the filtering drum includes an inner cylinder and an outer cylinder; the inner cylinder is fixed inside the outer cylinder; the first driving device includes a first spindle which goes through the outer cylinder and is fixed on one end of the inner cylinder; the inner cylinder includes a plurality of filtering pores disposed at one side thereof and an opening an opening at one end away from the; the recycling device goes through the opening and is fixed inside the inner cylinder; the first air ducting pipe is fixed on an upper end of the filtering drum; one side of the first air ducting pipe is opened and provided with an air ducting trough; and the air ducting trough faces the side wall of the inner cylinder directly; wherein the second-level filtering device includes a magnetic filter disposed on the top of the dirty fluid tank; the magnetic filter includes a housing, second liquid inlet pipe, second liquid outlet pipe, and third driving device; the second liquid inlet pipe is disposed at one side of the housing; the second liquid outlet pipe is disposed at a lower end of the housing; the second liquid outlet pipe having one end is connected with a liquid outlet of the housing and having another end thereof is disposed on a top of the third-level filtering device; the housing includes a plurality of magnetic rod sleeves disposed therein; the liquid outlet is disposed outside the magnetic rod sleeves; the third driving device is disposed on an upper end of the housing and includes drive shafts which are disposed in the magnetic rod sleeves.

More particularly, wherein the dirty fluid suction device includes a liquid level monitor; the liquid level monitor is electrically connected with the external vacuum device; the dirty fluid suction device further includes a float ball disposed therein; the float ball is disposed in an inner side wall of the vacuum tube; and the vacuum tube includes an opening disposed at a sidewall thereof.

More particularly, wherein the dirty fluid tank includes a first agitator and deoiling, device inside; the deoiling device includes a roller deoiling mechanism disposed at one side of the dirty fluid tank and an oil water separating tank disposed below the roller deoiling mechanism; and the roller deoiling mechanism includes a runner, a brush fixed on the runner and a cover hood disposed on a top of the roller; and the runner is fixed on the top of the dirty fluid tank.

More particularly, wherein the recycling device includes a second driving device, helical blade and recycling tank; the second driving device has a second spindle; the helical blade is wound on the second spindle; the second spindle drives the helical blade to rotate; the recycling tank is disposed below the helical blade; and the recycling tank having one end extends into a recycling bin outside the frame.

More particularly, wherein the first air ducting pipe is disposed between the inner cylinder and outer cylinder, and the air ducting trough is disposed vertically downward.

More particularly, wherein the filtering drum is a horizontal structure.

More particularly, wherein the third driving device also includes a drive seat; the drive seat is matched and connected with the upper end of the housing; one end of the drive shaft is fixedly connected with the drive seat, and the drive shaft is driven back and forth along the inner part of the magnetic rod sleeve.

More particularly, wherein the drive seat includes a piston member disposed therein; one end of the drive shaft is fixedly disposed on the piston member, and the drive shaft is driven back and forth along the magnetic rod sleeve under the driving of the piston member.

More particularly, wherein the drive shaft is a magnet structure.

More particularly, wherein the frame includes a cover body disposed thereon.

The cutting fluid intelligent recycling device of the present invention can effectively remove the cuttings, iron powder, floating oil stain, cenobium, floccule and impurities in the cutting fluid dirty fluid through the first-level filtering device, second-level filtering device and third-level filtering device to ensure a very good filtering effect and also sterilize and deodorize the cutting fluid dirty fluid so that the cutting fluid flowing into the clean liquid tank is basically aseptic and odorless with its floating oil stain content lower than 0.5% and impurity particle less than 0.01 mm to prolong the service life of cutting fluid and effectively reduce the cutting fluid use cost. Secondly, it can effectively block the bacteria breeding and eliminate the undesirable odor spreading to protect the human health. Moreover, it can prolong the service life of the tools using the cutting fluid, improve the part processing quality and reduce the time of dirty fluid cleaning by the working personnel, thus reducing the device maintenance cost, increasing the work efficiency and also improving the workshop air quality and protecting the ecological environment ultimately.

DETAILED DESCRIPTION OF THE INVENTION

Figure 1:
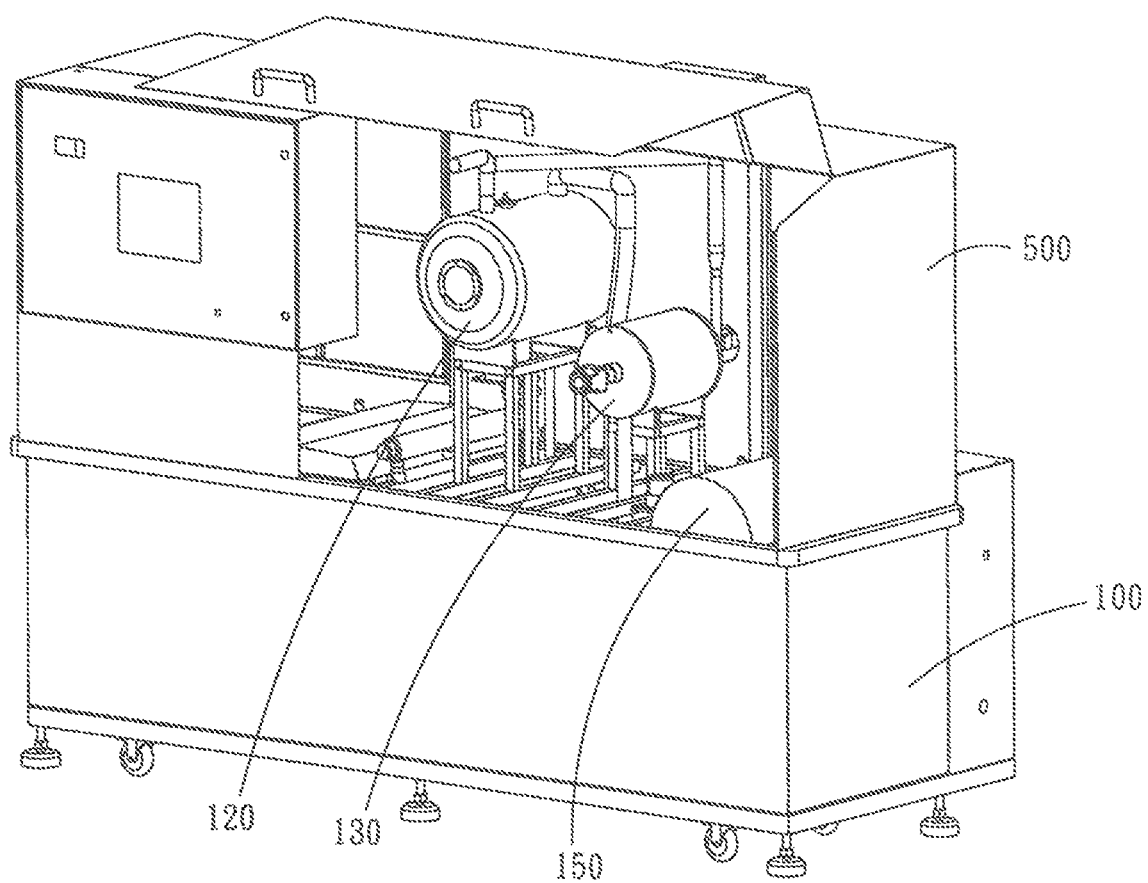
FIG. 1 is a structural schematic view of the present invention.
Figure 2:
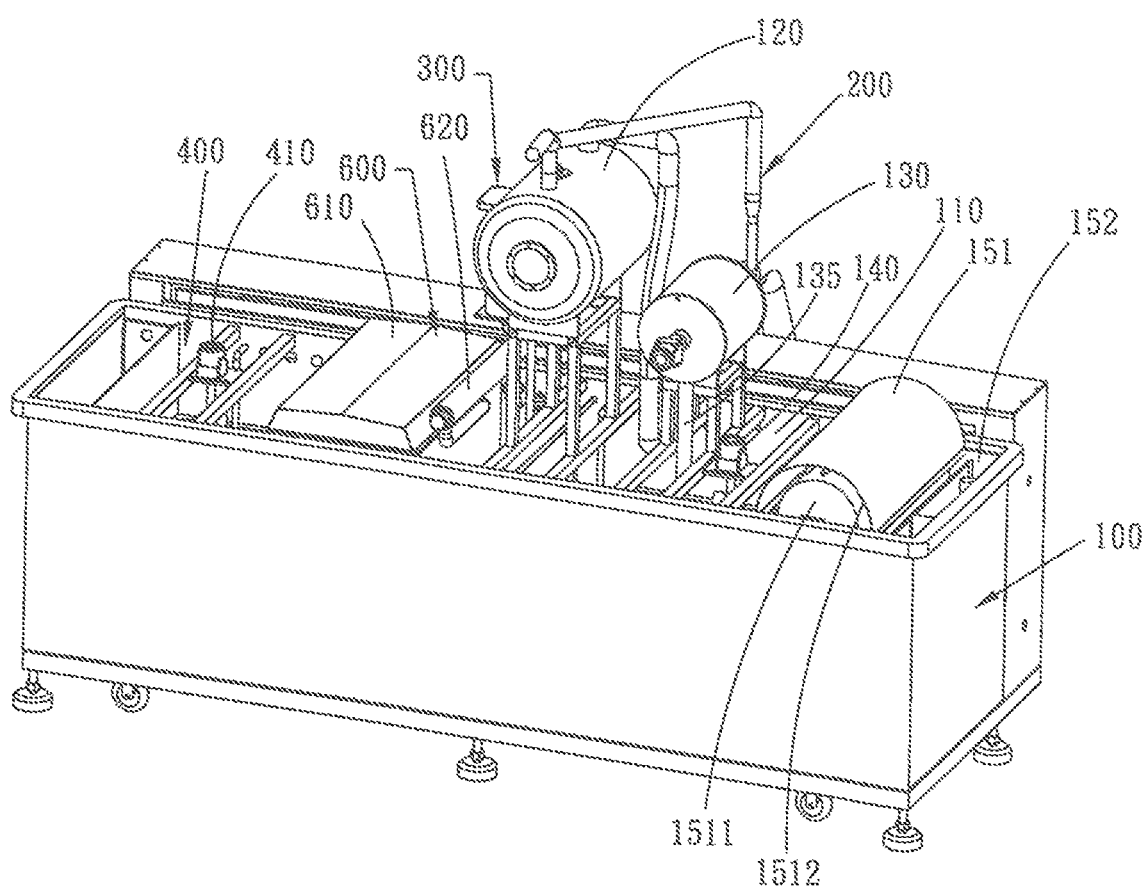
FIG. 2 is a structural schematic view of the present invention after hiding a cover body.
Figure 3:
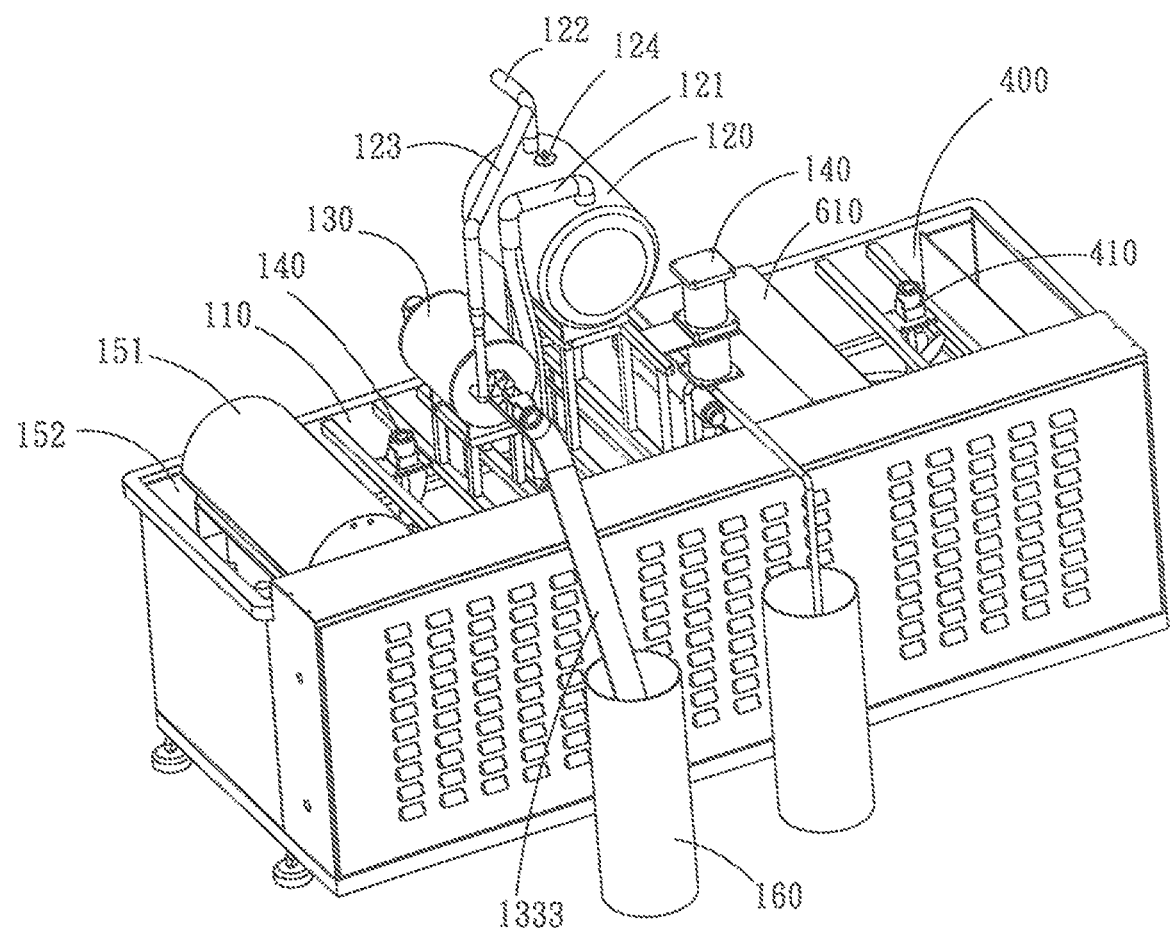
FIG. 3 is a structural schematic view of the present invention after hiding the cover body from another perspective.
Figure 4:
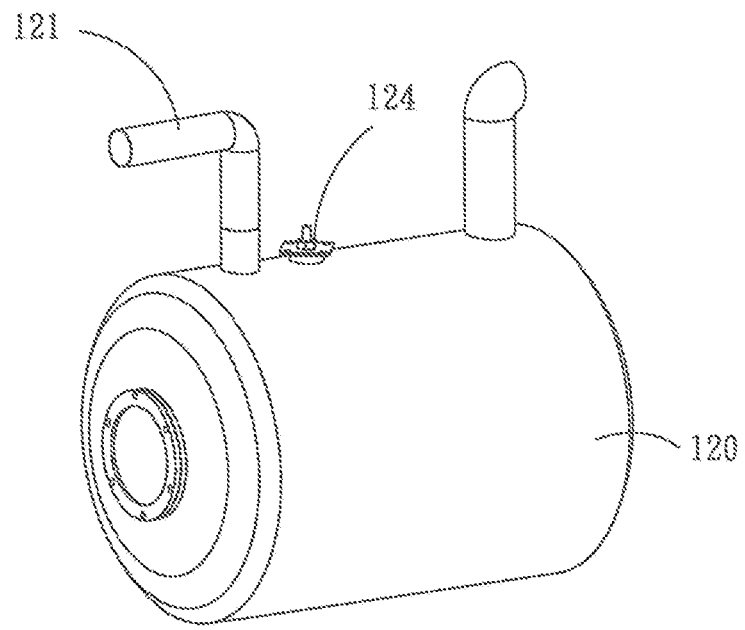
FIG. 4 is a structural schematic view of a dirty fluid suction device of the present invention.
Figure 5:
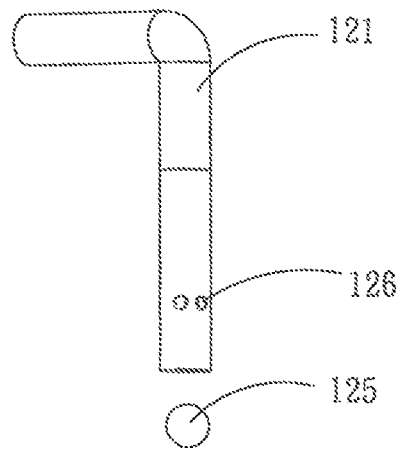
FIG. 5 is a structure decomposition view of a vacuum tube and float ball in the dirty fluid suction device of the present invention.

The invention will be further described in details hereinafter.

Referring to FIGS. 1 to 5, a cutting fluid intelligent recycling device comprises a frame 100 and a first-level filtering device 200, second-level filtering device 300, third-level filtering device 600 and clean liquid tank 400 installed on the frame 100. The cover body 500 is fixed and provided on top of the frame 100 used to cover the first-level filtering device 200, second-level filtering device 300 and clean liquid tank 400 to avoid the interference to the first-level filtering device 200, second-level filtering device 300, third-level filtering device 600 and clean liquid tank 400 by the external environment and increase the filtering effect of the cutting dirty fluid.

The first-level filtering device 200 is provided at one side of the frame; the first-level filtering device 200 is provide with the dirty fluid tank 110 used for containing liquid; the dirty fluid tank 110 is installed and provided with the dirty fluid suction device 120 and dirty fluid treatment device 130 on its top; the dirty fluid tank 110 is installed with the first agitator 140 and efficient deoiling device 150 inside; the dirty fluid suction device 120 is a vacuum drum suction device; the dirty fluid suction device 120 is provided with the vacuum tube 121, the first liquid inlet pipe 122 and the first liquid outlet pipe 123; the first liquid outlet pipe 123 is connected with the dirty fluid treatment device 130 on one end; the vacuum tube 121 is connected with the external vacuum device so that the inside of the dirty fluid suction device 120 is at a vacuum state, convenient for the first liquid inlet pipe 122 to draw the cutting fluid dirty fluid on the externally connected machine tool into the dirty fluid suction device 120 for collection; and the first liquid outlet pipe 123 is used to discharge the cutting dirty fluid in the dirty fluid suction device 120 to the dirty fluid treatment device 130 after the vacuum supply is stopped for the treatment in the next step.

In one embodiment, the dirty fluid suction device 120 is provided with the liquid level monitor 124; the liquid level monitor 124 is electrically connected with the external vacuum device; when the liquid level monitor 124 senses that the cutting dirty fluid in the dirty fluid suction device 120 reaches the specified liquid level, the external vacuum device would stop the vacuum operation and wait to start to work again until the liquid level in the dirty fluid suction device decreases; the dirty fluid suction device 120 is also provided with the float ball 125; the float ball 125 is provided inside the inside wall of vacuum tube 121; the side wall of vacuum tube 121 is provided with the opening 126; discharge some gas in the dirty fluid suction device 120 through the opening 126 of vacuum tube 121 when the work starts so that the inside of the dirty fluid suction device 120 is at a vacuum state; with the increase of the cutting dirty fluid drawn in the dirty fluid suction device 120, the float ball 125 in the vacuum tube 121 also goes up with the cutting dirty fluid level and block the vacuum tube 121 when it goes up to the opening 126; then the external vacuum device stops working for it cannot continue to draw out the gas inside the dirty fluid suction device 120 so that the external vacuum device can still work normally to detect the liquid level in the dirty fluid suction device 120 normally even when the liquid level monitor 124 has fault problems.

The efficient deoiling device 150 comprises the roller deoiling mechanism 151 installed at one side of the dirty fluid tank 110 and the oil water separating tank 152 provided underneath the roller deoiling mechanism 151; the roller deoiling mechanism 151 comprises the runner 1511, the brush (not shown in drawing) fixed on the runner 1511 and the cover hood 1512 provided on top of the roller; the runner 1511 is fixed on top of the dirty fluid tank 110; the brush is evenly attached onto the runner 1511 and take away the floating oil on the surface of the waster liquid in the dirty fluid tank 110 along with the rotation of the runner 1511; the cover hood 1512 is used to cover the runner 1511 to prevent the brush from splashing the floating oil out of the dirty fluid tank 110 during the rotation of the runner 1511.

Figure 6:
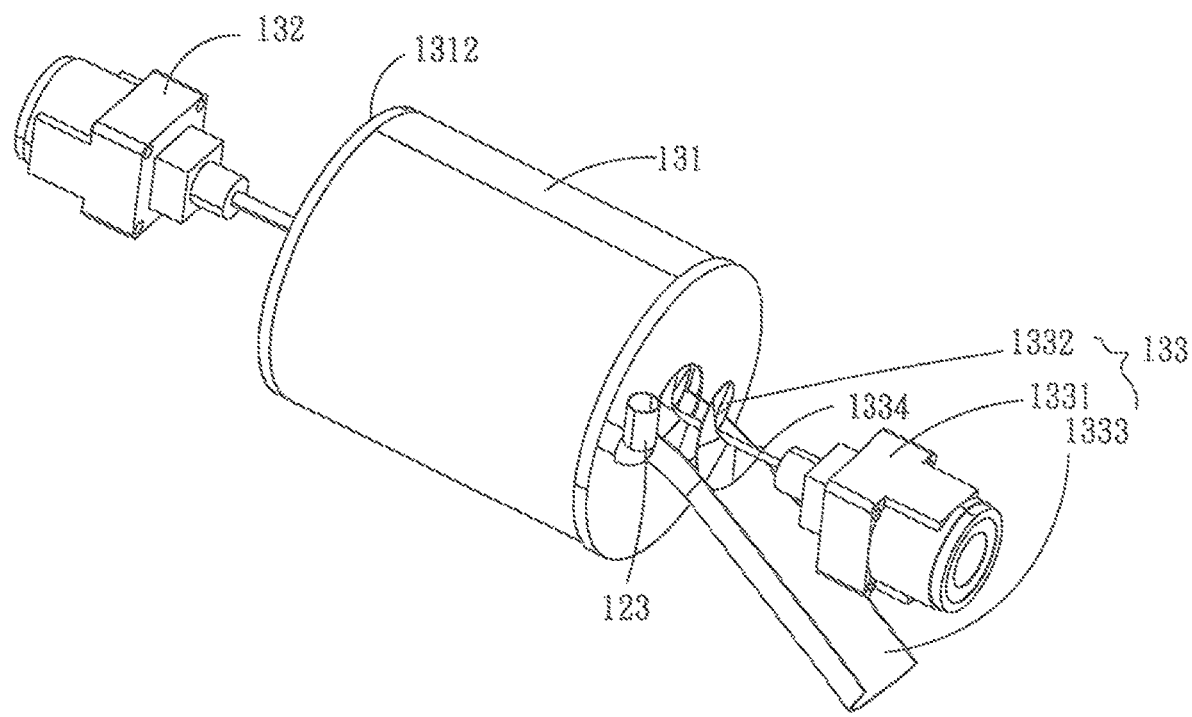
FIG. 6 is a structural schematic view of a dirty fluid treatment device of the present invention.
Figure 7:
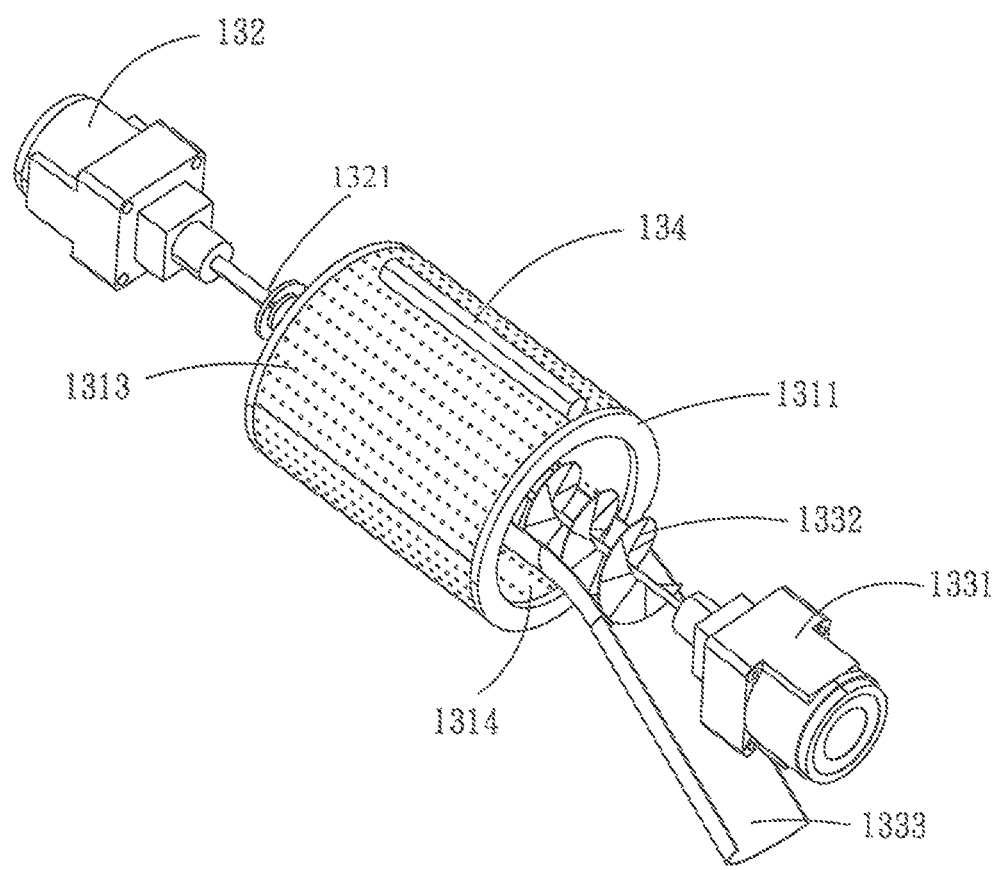
FIG. 7 is a structural schematic view of the dirty fluid treatment device of the present invention after hiding an outer cylinder.
Figure 8:
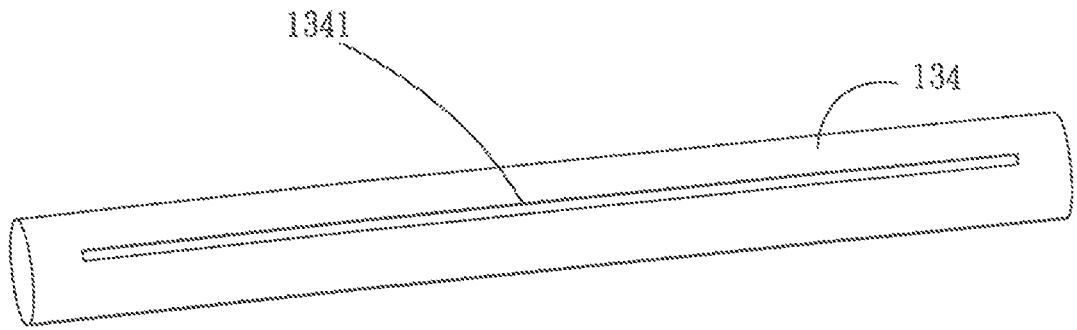
FIG. 8 is a structural schematic view of a first air ducting pipe of the present invention.

Referring to FIGS. 6 to 8, the dirty fluid treatment device 130 comprises the filtering drum 131, first driving device 132, recycling device 133 and first air ducting pipe 134; the filtering drum 131 is of horizontal construction; the filtering drum 131 is provided with the inner cylinder 1311 and outer cylinder 1312; the inner cylinder 1311 is fixed inside the outer cylinder 1312; the first driving device 132 is provided with the first spindle 1321; the first spindle 1321 goes through, the outer cylinder 1312 and is fixed on one end of the inner cylinder 1311; the inner cylinder 1311 makes cyclic rotation driven by the first spindle 1321 causing the cuttings attached onto the side wall of the inner cylinder 1311 to turn along with it.

The side wall of the inner cylinder 1311 is opened and provided with multiple filtering pores 1313; the filtering pores 1313 can block the cuttings in the dirty fluid to prevent the cuttings from entering the outer cylinder 1312 along with the dirty fluid to cause influence to the subsequent process; one end of the inner cylinder 1311 away from the first spindle 1321 is provided with the opening 1314; the recycling device 133 goes through the opening 1314 and is fixed in the inner cylinder 1311; the recycling device 133 is used to collect the cuttings remaining on the side wall of the inner cylinder 1311 for treatment to avoid the convenience in manual operation; the liquid discharge pipe 135 is provided underneath the outer cylinder 1312; one end of the liquid discharge pipe 135 extends to the top of the dirty fluid tank 110 used to allow the cutting fluid filtered out from the inner cylinder 1311 to flow into the dirty fluid tank 110 for the treatment procedure in the next step.

The recycling device 133 comprises the second driving device 1331, helical blade 1332 and recycling tank 1333; the second driving device 1331 is provided with the second spindle 1334; the helical blade 1332 is wound on the second spindle 1334; the second spindle 1334 drives the helical blade 1332 to rotate; the recycling tank 1333 is provided underneath the helical blade 1332; the end part of recycling tank 1333 extends into the recycling bin outside the frame 100; during the inner cylinder 1311 rotation, the cuttings would fall on the helical blade 1332 and be sent to the outer side of the opening 1314 gradually along with the rotation of helical blade 1332; and the cuttings on the helical blade 1332 would fall on the recycling tank 1333 and fall into the external recycling bin 160 along the recycling tank 1333 for treatment.

The first air ducting pipe 134 is fixed on the upper end of filtering drum 131; one side of the first air ducting pipe 134 is opened and provided with the air ducting trough 1341; the air ducting trough 1341 faces the side wall of the inner cylinder 1311 directly; the first air ducting pipe 134 would lead the external air flow into the filtering drum 131 where the air flow applies pressure onto the side wall of the inner cylinder 1311 through the air ducting trough 1341 so that the cuttings attached on the side wall of the inner cylinder 1311 fall down onto the helical blade 1332 under the action of the air flow.

Specifically, the first air ducting pipe 134 is provided between the inner cylinder 1311 and outer cylinder 1312; the air ducting trough 1341 is arranged in a vertically downward manner so as to blow the cuttings away from the side wall of the inner cylinder 1311 more efficiently. In one embodiment, the first air ducting pipe 134 can also be provided inside the inner cylinder 1311; the air ducting trough 1341 is arranged in the obliquely upward direction so as to blow the cuttings away from the side wall of the inner cylinder 1311 more efficiently.

Figure 9:
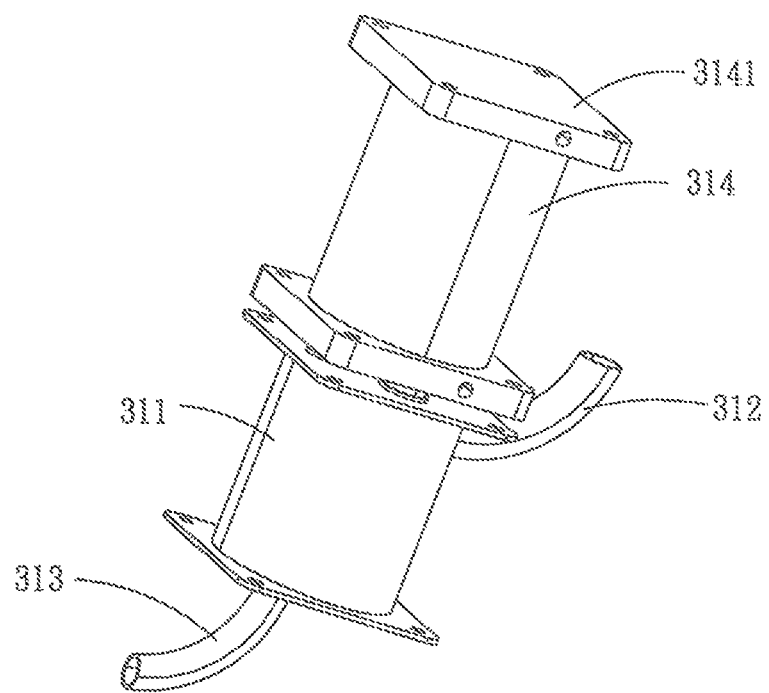
FIG. 9 is a structural schematic view of a magnetic filter of the present invention.
Figure 10:
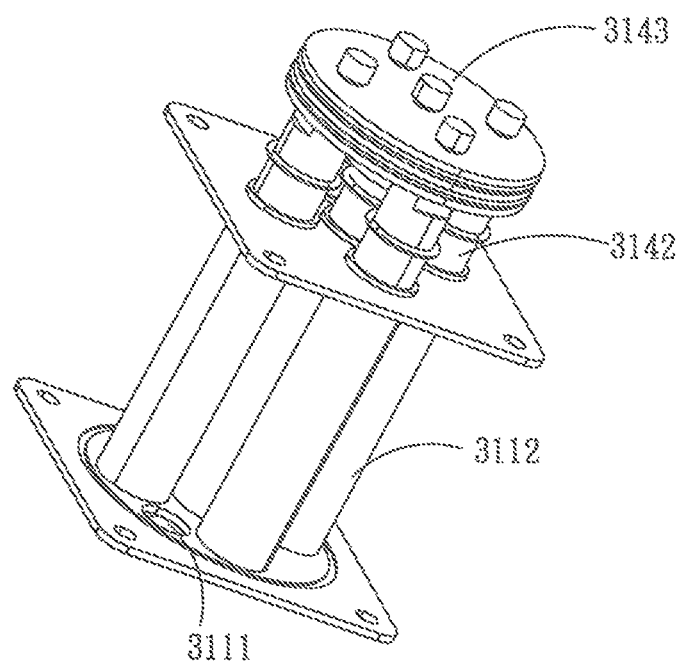
FIG. 10 is a structural schematic diagram of the magnetic filter of the present invention after hiding a housing and drive seat.

Referring to FIGS. 9 and 10, the second-level filtering device 300 comprises the magnetic filter 310 provided on top of the dirty fluid tank 110; the magnetic filter 310 comprises the housing 311, second liquid inlet pipe 312, second liquid outlet pipe 313 and third driving device 314; the second liquid inlet pipe 312 is provided at one side of the housing 311; the second liquid outlet pipe 313 is provided at the lower end of the housing 311; the second liquid outlet pipe 313 is matched and connected with the liquid outlet 3111 of the housing 311 on one end; the other end of the second liquid outlet pipe 313 is provided on top of the third-level filtering device 600 used to discharge the dirty fluid treated by the magnetic filter 310 into the third-level filtering device 600 for the treatment procedure in the next step; the housing 311 inside is provided with multiple magnetic rod sleeves 3112; the liquid outlet 3111 is provided outside the magnetic rod sleeves 3112; the dirty fluid enters into the housing 311 through the second liquid inlet pipe 312; the dirty fluid after treated is then recycled through the second liquid outlet pipe 313 for reuse.

The third driving device 314 is provided on the upper end of the housing 311; the third driving device 314 is of cylinder construction; the third driving device 314 comprises the drive seat 3141 and drive shaft 3142; the drive seat 3141 is matched and connected with the upper end of the housing 311; the drive shaft 3142 is provided inside the magnetic rod sleeve 3112; the drive shaft 3142 is fixed and connected with the drive seat 3141 on one end and makes the back-and-forth movement along the magnetic rod sleeve 3112 inside driven by the drive seat 3141; the drive shaft 3142 is of magnetic rod construction and used to absorb the iron chips in the dirty fluid flowing through the housing 311 to outside the magnetic rod sleeve 3112, which saves a lot of manpower and material resources and has good filtering effect; meanwhile, the adoption of the strong magnetic material and construction for the drive shaft 3142 enables the drive shaft 3142 to possess the magnetic action itself; and the reduction of the external installation space of the third driving device 314 to allow the drive shaft 3142 to make the back-and-forth movement in the drive seat 3141 has improved the effective utilization of the product construction.

In one embodiment, the drive seat 3141 is provided with the piston member 3143 inside; the drive shaft 3142 is fixed onto the piston member 3143 on one end; and the drive shaft 3142 makes the back-and-forth movement along the magnetic rod sleeve 3112 driven by the piston member 3143.

In one embodiment, the third-level filtering device 600 comprises the filtering tank 610 installed in the frame 100, the ultraviolet sterilization device 620 used for the liquid sterilization and the bag-type zippered filtering device (not shown in drawing) provided in the filtering tank 610 in a removable manner used to filter again the liquid filtered by the second-level filtering device 300; and the ultraviolet sterilization device 620 is installed on the frame 100.

The bag-type zippered filtering device comprises multiple filtering cotton bags with a rectangular internal cavity; the support is formed at the upper end of the filtering cotton bag through a support rod so that the filtering cotton bag is opened up and hung in the filtering tank 610 where the support rod is across the both sides of the filtering tank 610 at the top for the convenience of removal. The internal cavity of the filtering cotton bag is all provided with a stainless-steel frame; and the internal cavity is supported and positioned through the stainless-steel frame. Specifically, the stainless-steel frame is in a rectangular shape; and its periphery is against the upper, lower, left and right inside walls of the filtering cotton bag to form the supporting and positioning.

The filtering cotton bag's lower end is provided with a zipper able to open or close the rectangular space. The filter residue left after the cutting fluid is filtered in the filtering cotton bag can be taken out in a fast manner through this zipper.

Because the filtering cotton bag is stably opened up and positioned in the filtering tank through the support rod, it is convenient for assembly and future maintenance and very convenient to use. Moreover, because the filtering cotton bag inside is installed with a stainless-steel frame, so non-deformation of the shape of the filtering cotton bag can always be ensured, namely, always ensuring that its, filtering area would not become smaller due to deformation, expansion and squeezing each other, which has greatly increased the filtering effect and service life of the present invention. Furthermore, after the filtering cotton bag is used after a certain period of time, it can easily remove the support rod, take out the filtering cotton bag and take out the filter residue left after the cutting fluid is filtered in the filtering cotton bag fast by unzipping the zipper with the operation very simple and the use and replacement very convenient. In addition, it can be cleaned and reused and easily operated and can effectively reduce the use cost, having the environmental protection effect.

The second agitator 410 is provided in the clean liquid tank 400, a concentration monitoring device (not shown in drawing) used to detect the concentration of the cutting fluid; The detection probe of the concentration monitoring device extends into the clean liquid tank 400; and the concentration monitoring device uses the conductance method to indirectly measure and control the cutting fluid concentration based on the following principle: the theoretical value of the conductivity of purified water is 0 and the actual value is below 20 μs/cm; the cutting fluid is a mixture of various electrolytes with its conductivity increasing with the concentration increase; and the volume concentration of the cutting fluid of a same brand has a certain linear correlation with the conductivity; therefore, the cutting fluid concentration can be indirectly measured and controlled with the conductivity meter measurement data, characteristic of high degree of automation and being simple and feasible.

The second agitator 410 rotates continuously in the clean liquid tank 400 to stir the cutting fluid in the clean liquid tank 400; the oil particles in the cutting fluid form into large particles in the process of mixing due to the surface tension changes with the oil film (residual floating oil) formed as well floating on the cutting fluid surface; the oil film is pumped into the oil water separating tank 152 through the residual oil collecting pump for the treatment procedure in the next step so that the cutting fluid in the clean liquid tank 400 becomes cleaner.

In one embodiment, the dirty fluid tank 110 and clean liquid tank 400 is both provided with a deodorization device inside; and the deodorization device comprises the ozone generating device conducting deodorization through the chemical and biochemical actions, multiple gas pipes connected with the ozone generating device and nozzles installed on the gas pipes, among which, the dirty fluid tank 110 and clean liquid tank 400 are both provided with the gas pipes and nozzles.

The deodorization device utilizes the strong oxidation of ozone to kill various bacteria and microbes in the solution; and its advantages are that the sterilization effect is good; there is no residual pollution; and it would not cause irritation or allergic reactions to human skin after the ozone molecules escape from the liquid. In order to let the ozone bubbles stay in the liquid for a longer time in its rising process, the deodorization device adopts the sieve plate as the buffer medium to reduce the size of ozone bubbles and delay its rising process so that they can be distributed evenly in the liquid to achieve better sterilization effect.

In one embodiment, the dirty fluid tank 110 is also provided with an alum water injection device beside it; the water outlet of the alum water injection device is provided on the inside wall of the dirty fluid tank 110; the alum water is a known flocculant of mature technology, can be used in the seriously polluted cutting fluid specially and may not be added under normal circumstances.

During the operation of the present invention, the externally connected dirty fluid is drawn into the dirty fluid suction device 120 through the action of the external vacuum device and then discharged through the first liquid outlet pipe 123 to the dirty fluid treatment device 130 for treatment where the dirty fluid flows into the inner cylinder 1311 of the filtering drum 131; the first driving device 132 drives the first spindle 1321 to rotate at a certain speed; at the same time, the inner cylinder 1311 would turn along with the rotation of the first spindle 1321; then, some cuttings in the dirty fluid would be separated from the cutting fluid under the blocking by the filtering pores 1313; the cuttings would turn along with the turning of the inner cylinder 1311; and the cutting fluid enters into the outer cylinder 1312 through the inner cylinder 1311 and is diverted through the liquid discharge pipe 135 to the outside stored for recycling; the air flow in the first air ducting pipe 134 applies pressure onto the side wall of the inner cylinder 1311 after coming out through the air ducting trough 1341; then the cuttings attached on the side wall of the inner cylinder 1311 are blown onto the helical blade 1332 and the recycling tank 1333 underneath it under the action of the air flow; because the inner cylinder 1311 is in a cyclic turning state, the cuttings in the dirty fluid attached on the side wall of the inner cylinder 1311 are continuously blown off by the air flow out of the first air ducting pipe 134 so that the cuttings attached on the side wall of the inner cylinder 1311 are very little and the dirty fluid filtering effect would not be affected because the filtering pores 1313 are blocked due to the accumulation of the cuttings to automatically fulfill the cleaning of the side wall of the inner cylinder 1311, which has reduced the labor cost greatly and increased the work efficiency. At the meantime, the second driving device 1331 drives the second spindle 1334 to rotate and the helical blade 1332 fixed onto the second spindle 1334 rotates along as well; the cuttings falling on the helical blade 1332 would be sent to the outer side of the opening 1314 of the inner cylinder 1311 gradually along with the rotation of the helical blade 1332 and further break away from the helical blade 1332 to fall onto the recycling tank 1333; and the cuttings falling on the recycling tank 1333 would be transferred into the external recycling bin 160 for treatment along the rail of the recycling tank 1333.

The dirty fluid treated by the dirty fluid treatment device 130 would enter into the magnetic filter 310 and flush the outer sidewall of the magnetic rod sleeve 3112 by way of pumping by the second liquid inlet pipe 312; then, the drive seat 3141 would drive the drive shaft 3142 to move so that the drive shaft 3142 would be located in magnetic rod sleeve 3112; because of the strong magnetic action of the drive shaft 3142, the iron chips in the dirty fluid would be absorbed firmly at the outer side of the magnetic rod sleeve 3112, thus having the filtering function; through the strong magnetic absorption action of the drive shaft 3142, the quantity of iron chips in the dirty fluid is reduced to the minimum and it is further discharged through the second liquid outlet pipe 313 to the outside for recycling, which has good filtering effect, prolongs the cutting fluid use time and reduces the production cost.

In conclusion, the high energy-efficient cutting fluid intelligent recycling device of the present invention can effectively remove the cuttings, iron powder, floating oil stain, cenobium, floccule and impurities in the dirty fluid through the first-level filtering device 200, second-level filtering device 300 and third-level filtering device 600 to ensure a very good filtering effect and also sterilize and deodorize the dirty fluid so that the cutting fluid flowing into the clean liquid tank 400 is basically aseptic and odorless with its floating oil stain content lower than 0.5% and impurity particle less than 0.01 mm to prolong the service life of cutting fluid and effectively reduce the cutting fluid use cost. Secondly, it can effectively block the bacteria breeding and eliminate the undesirable odor spreading to protect the human health. Moreover, it can prolong the service life of the tools using the cutting fluid, improve the part processing quality and reduce the time of dirty fluid cleaning by the working personnel, thus reducing the device maintenance cost, increasing the work efficiency and also improving the workshop air quality and protecting the ecological environment ultimately.

The above only describes some exemplary embodiments of the present invention. Those having ordinary skills in the art may also make many modifications and improvements without departing from the conception of the invention, which shall all fall within the protection scope of the invention.

I claim:

1. A cutting fluid recycling device, comprising:
a frame and a first-level filter, a second-level filter, a third-level filter and a clean fluid tank installed on the frame; wherein the first-level filter is disposed at one side of the frame and includes a dirty fluid tank used for containing liquid; the dirty fluid tank includes a dirty fluid suction device and a dirty fluid treatment device disposed on a top of the dirty fluid tank;
wherein the dirty fluid suction device is a vacuum drum suction device and includes a vacuum tube, a first liquid inlet pipe, and a first liquid outlet pipe; the first liquid outlet pipe is connected with the dirty fluid treatment device on one end; and the vacuum tube is connected with an external vacuum pump;
wherein the dirty fluid treatment device includes a filtering drum, a first driving device, a recycling assembly, and a first air ducting pipe; the filtering drum includes an inner cylinder and an outer cylinder; the inner cylinder is fixed inside the outer cylinder; the first driving device includes a first spindle which goes through the outer cylinder and is fixed on one end of the inner cylinder; the inner cylinder includes a plurality of filtering pores disposed at one side of the inner cylinder and an opening disposed at one end away from the inner cylinder; the recycling assembly goes through the opening and is fixed inside the inner cylinder, the first air ducting pipe is fixed on an upper end of the filtering drum; one side of the first air ducting pipe is opened and provided with an air ducting trough; and the air ducting trough faces the side wall of the inner cylinder directly;
wherein the second-level filter includes a magnetic filter disposed on the top of the dirty fluid tank; the magnetic filter includes a housing, second liquid inlet pipe, second liquid outlet pipe, and third driving device;
the second liquid inlet pipe is disposed at one side of the housing; the second liquid outlet pipe is disposed at a lower end of the housing; one end of the second liquid outlet pipe is connected with a liquid outlet of the housing and another end of the second liquid outlet pipe is disposed on a top of the third-level filter; the housing includes a plurality of magnetic rod sleeves disposed therein; the liquid outlet is disposed outside the magnetic rod sleeves; the third driving device is disposed on an upper end of the housing and includes drive shafts which are disposed in the magnetic rod sleeves.

2. The cutting fluid recycling device according to claim 1, wherein the dirty fluid suction device includes a liquid level monitor; the liquid level monitor is electrically connected with the external vacuum pump; the dirty fluid suction device further includes a float ball disposed therein; the float ball is disposed in an inner side wall of the vacuum tube; and the vacuum tube includes an opening disposed at a sidewall of the vacuum tube.

3. The cutting fluid recycling device according to claim 1, wherein the dirty fluid tank includes a first agitator and deoiling device disposed inside the dirty fluid tank; the deoiling device includes a roller deoiling mechanism disposed at one side of the dirty fluid tank and an oil water separating tank disposed below the roller deoiling mechanism; and the roller deoiling mechanism includes a runner, a brush fixed on the runner and a cover hood disposed on a top of the roller; and the runner is fixed on the top of the dirty fluid tank.

4. The cutting fluid recycling device according to claim 1, wherein the recycling assembly includes a second driving device, helical blade and recycling tank; the second driving device has a second spindle; the helical blade is wound on the second spindle; the second spindle drives the helical blade to rotate; the recycling tank is disposed below the helical blade; and one end of the recycling tank extends into a recycling bin outside the frame.

5. The cutting fluid recycling device according to claim 1, wherein the first air ducting pipe is disposed between the inner cylinder and outer cylinder, and the air ducting trough is disposed vertically downward.

6. The cutting fluid recycling device according to claim 1, wherein the filtering drum is cylindrical and the upper and lower ends of the filtering drum are horizontally arranged.

7. The cutting fluid recycling device according to claim 1, wherein the third driving device also includes a drive seat; the drive seat is matched and connected with the upper end of the housing; one end of a drive shaft is fixedly connected with the drive seat, and the drive shaft is driven back and forth along the inner part of a magnetic rod sleeve.

8. The cutting fluid recycling device according to claim 7, wherein the drive seat includes a piston member disposed therein; another end of the drive shaft is fixedly disposed on the piston member, and the drive shaft is driven back and forth along the magnetic rod sleeve under the driving of the piston member.

9. The cutting fluid recycling device according to claim 7, wherein the drive shaft is a magnet rod.

10. The cutting fluid recycling device according to claim 1, wherein the frame includes a cover body disposed thereon.

* * * * *